US010389105B2

(12) United States Patent
Schweinzger et al.

(10) Patent No.: US 10,389,105 B2
(45) Date of Patent: Aug. 20, 2019

(54) OVERVOLTAGE PROTECTION ELEMENT AND METHOD FOR PRODUCING AN OVERVOLTAGE PROTECTION ELEMENT

(71) Applicant: EPCOS AG, Munich (DE)

(72) Inventors: Manfred Schweinzger, Schwhhanberg (AT); Stefan Obermair, Stainz (AT); Pavol Dudesek, Deutschlandsberg (AT)

(73) Assignee: EPCOS AG, München (DE)

( * ) Notice: Subject to any disclaimer, the term of this patent is extended or adjusted under 35 U.S.C. 154(b) by 168 days.

(21) Appl. No.: 15/110,701

(22) PCT Filed: Jan. 15, 2015

(86) PCT No.: PCT/EP2015/050681
§ 371 (c)(1),
(2) Date: Jul. 8, 2016

(87) PCT Pub. No.: WO2015/124336
PCT Pub. Date: Aug. 27, 2015

(65) Prior Publication Data

US 2016/0329698 A1 Nov. 10, 2016

(30) Foreign Application Priority Data

Feb. 18, 2014 (DE) ........................ 10 2014 102 020

(51) Int. Cl.
*H01T 4/12* (2006.01)
*H02H 3/20* (2006.01)

(52) U.S. Cl.
CPC ................. *H02H 3/20* (2013.01); *H01T 4/12* (2013.01)

(58) Field of Classification Search
CPC .................................... H02H 3/20; H01T 4/12
USPC ......................................................... 361/91.1
See application file for complete search history.

(56) References Cited

U.S. PATENT DOCUMENTS

| | | | |
|---|---|---|---|
| 6,204,549 B1 | 3/2001 | Igel et al. | |
| 9,374,877 B2 | 6/2016 | Sumi et al. | |
| 2008/0079533 A1 | 4/2008 | Liu et al. | |
| 2011/0304946 A1 | 12/2011 | Koga et al. | |
| 2013/0141828 A1 | 6/2013 | Asakura et al. | |
| 2014/0340812 A1* | 11/2014 | Sumi | H01T 1/20 361/220 |

FOREIGN PATENT DOCUMENTS

| | | |
|---|---|---|
| DE | 19736754 A1 | 3/1999 |
| JP | H10135008 A | 5/1998 |
| JP | 2012074460 A | 4/2012 |
| WO | 2010122732 A1 | 10/2010 |
| WO | 2013129272 A1 | 9/2013 |
| WO | 2013132988 A1 | 9/2013 |

* cited by examiner

*Primary Examiner* — Kevin J Comber
(74) *Attorney, Agent, or Firm* — Slater Matsil, LLP

(57) ABSTRACT

An overvoltage protection element and a method for producing an overvoltage protection element is disclosed. In an embodiment, the overvoltage protection element includes a first electrode, a second electrode and a discharge region arranged between the first electrode and the second electrode, wherein a porous discharge dielectric is arranged in the discharge region, and wherein the overvoltage protection element is configured to discharge a gas in pores of the discharge dielectric and produce an electrically conductive connection between the first electrode and the second electrode.

17 Claims, 5 Drawing Sheets

10
5
6
5
2
4
~ 15 µm
~ 35 µm
50 µm
3
1

10
5
6
5
2
4
~ 15 μm
~ 35 μm
50 μm
3
1

10
3
2
4
1 mm 2
7
3
1
20 μm

OVERVOLTAGE PROTECTION ELEMENT AND METHOD FOR PRODUCING AN OVERVOLTAGE PROTECTION ELEMENT

This patent application is a national phase filing under section 371 of PCT/EP2015/050681, filed Jan. 15, 2015, which claims the priority of German patent application 10 2014 102 020.0, filed Feb. 18, 2014, each of which is incorporated herein by reference in its entirety.

TECHNICAL FIELD

Overvoltage protection element and method for producing an overvoltage protection element.

SUMMARY OF THE INVENTION

The present invention relates to an overvoltage protection element and to a method for producing an overvoltage protection element.

Embodiments provide an improved overvoltage protection element which, in particular, is compact and cost-effective and/or can be produced cost-effectively, and/or to specify an improved overvoltage protection component.

In an embodiment, a proposed overvoltage protection element comprises a first electrode and a second electrode, and a discharge region arranged between the first electrode and the second electrode, wherein a porous discharge dielectric is arranged in the discharge region. The first electrode can form a stabilization body of the overvoltage protection element. The overvoltage protection element is furthermore designed to discharge a gas in the pores of the porous discharge dielectric and thus to produce an electrically conductive connection between the first electrode and the second electrode. The discharge dielectric preferably serves for electrically isolating the first electrode from the second electrode, and vice versa. The overvoltage protection element can advantageously be producible or produced in or with a particularly small structural height of typically less than 100 μm, preferably less than 50 μm. Furthermore or as a result, the overvoltage protection element presented preferably allows a configuration with very low electrical capacitances, for example, for use in radio-frequency applications. Moreover, the use of expensive noble metal electrodes can advantageously be dispensed with by virtue of electrodes on the basis of a copper film or screen printing electrodes comprising copper (Cu) as the main constituent.

In various embodiment, the overvoltage protection element is designed for protecting an electronic assembly, for example, against overvoltages on the basis of an air discharge or barrier discharge. The discharge is preferably a dielectric barrier discharge and the gas is preferably air or a gas mixture comprising $N_2$ and $H_2$. Furthermore, the pores of the porous discharge dielectric serve as a discharge gap.

The discharge in the pores of the porous discharge dielectric preferably gives rise to free electrons and/or ionized gas molecules, for example, from the ambient air, which produce an electrical contact between the two electrodes as soon as an overvoltage present at the two electrodes is exceeded. The contact can preferably carry particularly high electric currents.

Said overvoltage can be determined, for example, by virtue of the fact that it exceeds a specific threshold value starting from which, for example, an assembly to be protected by the overvoltage protection element is destroyed or damaged. Such an overvoltage can preferably be dissipated toward ground during the operation of the overvoltage protection element.

In one configuration, the discharge dielectric has a low dielectric constant. As a result of this configuration, electrical capacitances, in particular parasitic capacitances, during the operation of the overvoltage protection element can advantageously be prevented or restricted.

In one configuration, the first electrode and the second electrode are composed of a base metal. As a result of this configuration, the use of expensive noble metals as electrode materials can advantageously be dispensed with.

In one configuration, the first electrode and the second electrode are composed of copper (Cu). As a result of this configuration, the properties of a high electrical and thermal conductivity can advantageously be utilized during the operation of the overvoltage protection element.

In one configuration, the discharge region or the discharge dielectric has a thickness of between 5 μm and 50 μm.

In one configuration, the overvoltage protection element has a component thickness of between 30 μm and 100 μm.

The last two embodiments mentioned advantageously allow a compact configuration of the overvoltage protection element, particularly along a component height thereof. As a result, a cost- and space-efficient miniaturization can furthermore be achieved. Furthermore, this small structural height affords the possibility of positioning the components in a space-saving fashion, for example, below the assemblies to be protected on a circuit board, or even integrating them into the circuit board.

In one configuration, the discharge dielectric comprises zirconium oxide, for example, $ZrO_2$, aluminum oxide, for example, $Al_2O_3$, and/or magnesium oxide, for example, MgO, or consists of one or more of these materials. Zirconium dioxide advantageously has a low dielectric constant, such that parasitic capacitances, as mentioned above, can advantageously be prevented during the operation of the overvoltage protection element, in particular in interaction with an assembly to be protected against overvoltages, for example, of an electronic component.

In one configuration, the overvoltage protection element comprises a connection region, wherein a connection dielectric is arranged in the connection region, via which connection dielectric the first and second electrodes are mechanically stably connected to one another. The connection dielectric is expediently likewise provided for electrically isolating the first and second electrodes and preferably likewise has a low dielectric constant, preferably having values of between 5 and 100 As/Vm.

As a result of providing the connection dielectric, the mechanical stability of the overvoltage protection element, in particular mechanical stability or cohesion between the first electrode and the second electrode, can preferably be achieved or produced in the connection region.

In one configuration, the connection dielectric is arranged at least partly in an interspace formed between the first and second electrodes. This configuration expediently allows the formation of the connection region, and as a result the production of the mechanical stability of the overvoltage protection element between the first and second electrodes.

In one configuration, the connection dielectric is connected to the first and second electrodes mechanically more stably than the discharge dielectric. This connection preferably relates to a standard connection, for example, a sintering connection, between dielectric materials and electrode materials.

In one configuration, the discharge region and the connection region are arranged alongside one another. A compact design, for example, thin-film design, of the overvoltage protection element can advantageously be made possible as a result of this configuration. Furthermore, this configuration advantageously allows the connection dielectric and the discharge dielectric to act or to function as a common or similarly to a common dielectric of the overvoltage protection element.

In one configuration, the connection region extends around the discharge region as viewed in a plan view of the overvoltage protection element. As a result of this configuration, the mechanically stable connection and/or the mechanical stability of the overvoltage protection element in the regions extending around the discharge region can advantageously be produced in a particularly expedient manner.

In one preferred configuration, the discharge dielectric has a greater porosity than the connection dielectric. This configuration advantageously makes it possible to produce the discharge region and also the mechanical stability or connection via the connection region. In other words, the greater porosity of the discharge dielectric allows the discharge of a gas in the pores of the discharge dielectric, wherein a smaller porosity and/or, for example, a resultant greater density of the connection dielectric enables the mechanically stable connection between the first and second electrodes and/or the mechanical stability of the overvoltage protection element.

In one configuration, the discharge dielectric and the connection dielectric are formed by two different and/or separate components or bodies, for example, dielectric bodies, composed of different materials. In accordance with this configuration, the materials of the discharge dielectric and of the connection dielectric are preferably not cohesively connected to one another. Instead there preferably exists a discrete phase transition between different material phases of the discharge dielectric and of the connection dielectric. In this context, the material phases preferably do not denote states of matter.

In accordance with this configuration, the connection dielectric and the discharge dielectric can be provided preferably separately and/or sequentially, for example, during the production of the overvoltage protection element.

In one configuration, the connection dielectric between the first and second electrodes at least partly overlaps the discharge dielectric. As a result of this configuration, under certain circumstances, the mechanical stability of the overvoltage protection element can be produced solely by the first electrode and the connection dielectric.

In one configuration, the connection dielectric and the discharge dielectric are formed by different material phases in a common dielectric body. In accordance with this configuration, said material phases can continuously merge into one another. Preferably, in accordance with this configuration, the connection dielectric and the discharge dielectric are cohesively linked to one another or are cohesively connected to one another.

In one configuration, the first electrode is a copper layer having a layer thickness of between 10 μm and 100 μm. In accordance with this configuration, the first electrode can advantageously function as a stabilization body, of the overvoltage protection element.

In one configuration, the first electrode forms a stabilization body for the overvoltage protection element. As a result of this configuration, advantageously a separate carrier of the overvoltage protection element can be dispensed with and the overvoltage protection element can be embodied compactly, in particular with a small component thickness.

In an alternative configuration, the overvoltage protection element comprises a ceramic film as stabilization body, on which the first electrode is applied or arranged. This configuration advantageously allows a surface-mountable configuration of the overvoltage protection element.

In one configuration, the first electrode and the second electrode are structured, wherein the overvoltage protection element is embodied in a surface-mountable fashion. As a result of this configuration, it is possible in particular to utilize the advantages of a surface-mountable configuration, for example, the possibility of soldering the overvoltage protection element directly onto a printed circuit board or electronic assembly.

A further aspect of the present application relates to an overvoltage protection component comprising a multiplicity of overvoltage protection elements, as described above, which are arranged alongside one another in an array. In accordance with this configuration, the overvoltage protection elements are preferably arranged and/or produced alongside one another and/or as strips or in a common plane or on a common surface. In accordance with this configuration, furthermore, the array of overvoltage protection elements, for example, for integration into an electronic assembly of an electronic device, for example, can furthermore be made possible or simplified.

In one configuration of the overvoltage protection component, the overvoltage protection elements are arranged one above another in a multilayer embodiment in the overvoltage protection component. As a result of this configuration, advantageously a higher current-carrying capacity of the component can be made possible and/or the current-loading capacity of the overvoltage protection component can advantageously be increased.

A further aspect of the present application relates to an electronic component comprising at least one overvoltage protection element as described above which is integrated into the design of an assembly of the electronic component that is to be protected against overvoltages by said overvoltage protection element.

A further aspect of the present application relates to a method for producing the overvoltage protection element. The method comprises providing the first electrode for the overvoltage protection element, providing the first electrode with a basic material for the discharge dielectric, and providing the first electrode provided with the basic material with a connection material for the connection dielectric. The method furthermore comprises providing the first electrode provided with the basic material with a second electrode for producing a basic body. Preferably, the first electrode is provided with the connection material before said first electrode is provided with the second electrode. The method additionally comprises exposing the basic body to a temperature, wherein the temperature is chosen in such a way that the connection material is sintered with the first and second electrodes and the connection dielectric is thus formed, and the discharge dielectric is formed from the basic material, wherein the discharge dielectric is porous. The mechanical stability or the mechanical cohesion of the overvoltage protection element between the first and second electrodes is preferably produced during the sintering.

The connection material and the basic material are preferably both unsintered raw materials. By way of example, both the basic material and the connection material comprise a ceramic powder. The materials mentioned are preferably chosen in such a way that at the temperature the connection material can expediently be sintered more effectively, better or more densely than the basic material in order thus to produce the mechanical stability of the overvoltage protection element.

Expediently, after exposing the basic body to the temperature, which is preferably a sintering temperature, pores remain in the discharge dielectric, which pores, as described above, serve as discharge gaps for a gas discharge in the pores of the discharge dielectric.

In one configuration of the method, the temperature is below the melting point of copper. This configuration is particularly expedient when copper electrodes are used, in order to avoid melting of the electrodes during the production of the overvoltage protection element.

In one configuration of the method, the temperature is between 500° C. and 1050° C.

In one configuration of the method, the basic body is exposed to the temperature under a protective gas atmosphere. This configuration makes it possible, in particular, to protect the first and/or the second electrode against oxidation. For the case where the first and/or the second electrode consists of copper, it is thus possible to prevent the copper from being oxidized and the electrodes from becoming unusable and the function of the overvoltage protection element from thus being restricted or prevented.

In one configuration of the method, for providing the first electrode with the basic material, the latter is applied in a structured fashion. As described above, this configuration can enable the arrangement of the basic material only in specific regions, for example, on the surface of the overvoltage protection element or overvoltage protection component.

In one configuration of the method, for providing the first electrode with the connection element, the latter is applied in a structured fashion. This configuration allows the arrangement of the connection dielectric, for example, in specific regions of the surface of the overvoltage protection element or overvoltage protection component, in particular in the connection region or connection regions.

In one configuration of the method, the connection material is arranged alongside the basic material. In this case, the connection material, in the course of providing the first electrode with the materials mentioned, preferably apart from the at least partial overlap mentioned above, can be arranged completely alongside the basic material, for example, in the same layer plane.

In one configuration of the method, the first electrode is provided with the basic material over a large area, wherein the connection material is applied to the basic material and in this case regions of the basic material remain free of the connection material. In this case, the regions expediently remain free for forming the discharge dielectric. In accordance with the configuration, the connection material is preferably chosen in such a way that already at the temperature mentioned the mechanical stability of the overvoltage protection element is made possible during the sintering or the exposure of the basic body to the temperature.

In one configuration of the method, the temperature is between 500° C. and 1050° C.

In one configuration of the method, the connection material diffuses through the basic material during exposure to the temperature, as a result of which the mechanical stability between the first electrode and the second electrode is produced.

In one configuration of the method, the first electrode is provided with the basic material and the connection material by means of screen printing.

In one configuration of the method, the first electrode is provided by sheet drawing.

A further aspect of the present application relates to a method for producing an overvoltage protection component comprising a multiplicity of overvoltage protection elements, as described above, which are arranged alongside one another in an array. In this case, the individual overvoltage protection elements have expediently been processed in parallel, such that method steps described above for the individual overvoltage protection element can equally apply to the overvoltage protection component.

In one configuration of the method described last, the overvoltage protection component is singulated into individual overvoltage protection elements after the exposure of the basic body to the temperature.

The overvoltage protection element and/or the overvoltage protection component is preferably producible or produced by means of the method described here; in particular, all features disclosed for the method are also disclosed for the overvoltage protection element and/or the overvoltage protection component, and vice versa.

BRIEF DESCRIPTION OF THE DRAWINGS

Further advantages, advantageous configurations and expediencies of the invention will become apparent from the following description of the exemplary embodiments in association with the figures.

DETAILED DESCRIPTION OF ILLUSTRATIVE EMBODIMENTS

Elements that are identical, of identical type and act identically are provided with identical reference signs in the figures. The figures and the size relationships of the elements illustrated in the figures among one another should not be regarded as to scale. Rather, individual elements may be illustrated with an exaggerated size in order to enable better illustration and/or in order to afford a better understanding.

Figure 1A:
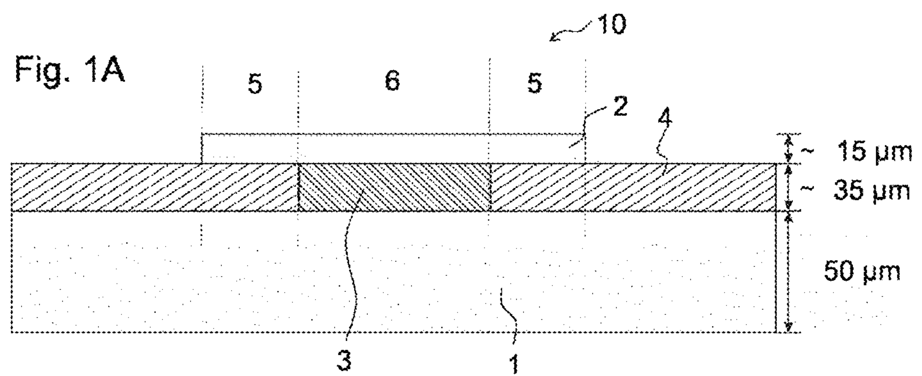
FIG. 1A shows a schematic sectional or side view of an overvoltage protection element.

FIG. 1A shows an overvoltage protection element 10 in a first configuration. The overvoltage protection element 10 comprises a first electrode 1. The first electrode 1 is preferably provided by sheet drawing of a solid Cu sheet or of a Cu workpiece, as is customary or known, for example, in or from the production of batteries. Alternatively, the first electrode 1 can be provided by screen printing or some other suitable method. The first electrode 1 can have a layer thickness of between 10 μm and 100 μm.

The overvoltage protection element 10 furthermore comprises a second electrode 2. The first and second electrodes 1, 2 are preferably composed of copper or some other base metal. The first electrode 1 furthermore preferably constitutes a stabilization body for the overvoltage protection element 10.

The overvoltage protection element 10 additionally comprises a discharge dielectric 3. The discharge dielectric 3 preferably has a low dielectric constant, for example, having values of between 5 and 100 As/Vm. In accordance with this embodiment, the discharge dielectric 3 preferably consists of zirconium oxide (for example, $ZrO_2$) with a glass proportion of 5% or comprises the latter with a glass proportion of 5%. Alternatively, the discharge dielectric 3 can comprise aluminum oxide, for example, $Al_2O_3$, and/or magnesium oxide, for example, MgO. The discharge dielectric 3 is preferably porous or has pores (cf. 7 in FIG. 1C). The overvoltage protection element 10 is preferably designed to discharge a gas in the pores of the discharge dielectric and thus to produce an electrically conductive connection between the first electrode 1 and the second electrode 2. The discharge dielectric 3 can have a thickness of between 5 μm and 50 μm. Exemplary thicknesses of the individual layers of the overvoltage protection element 10 shown in FIG. 1A are depicted at the right-edge of the figure.

The discharge dielectric preferably has a thickness of between 5 μm and 50 μm.

The overvoltage protection element 10 furthermore comprises a connection dielectric 4, which is arranged on both sides of the discharge dielectric 3 in FIG. 1A. The connection dielectric 4 preferably likewise has a low dielectric constant, for example, having values of between 5 and 100 As/Vm. The connection dielectric 4 is arranged at least partly in an interspace (not explicitly identified) formed by the first electrode 1 and the second electrode 2.

As viewed in a plan view of the overvoltage protection element 10, the connection dielectric 4 preferably extends around the discharge dielectric 3. In accordance with this embodiment, the connection dielectric 4 preferably consists of zirconium oxide (for example, $ZrO_2$) with a glass proportion of 30% or comprises the latter with a glass proportion of 30%. Alternatively, the connection dielectric 4 can comprise aluminum oxide, for example, $Al_2O_3$, and/or magnesium oxide, for example, MgO, or some other material which is not or not completely densified or sintered, for example, during exposure to the temperature without the relatively high glass proportion mentioned.

In accordance with this embodiment, the discharge dielectric 3 and the connection dielectric 4 preferably comprise or consist of a ceramic.

In FIG. 1A, the region 5 denotes a connection region in which the first electrode 1 and the second electrode 2 are mechanically stably connected to one another via the connection dielectric 4 and thus produce or ensure the mechanical stability of the overvoltage protection element 10. The overvoltage protection element 10 furthermore comprises a discharge region 6, in which the abovementioned gas discharge can be ignited or established between the first electrode 1 and the second electrode 2—in the case of an overvoltage that is applied to these electrodes or occurs therebetween. The overvoltage mentioned can preferably be dissipated via a ground terminal of the overvoltage protection element 10.

On account of the composition, the connection dielectric can likewise comprise a porous material and/or have pores. Expediently, however, the porosity of the discharge dielectric 3 is greater than that of the connection dielectric 4.

The connection dielectric 4 and/or the second electrode 2 are/is preferably applied or provided in structured form by means of screen printing. Preferably, the second electrode 2 is furthermore applied or deposited in such a way that it does not completely cover the first electrode, for example.

During production of the overvoltage protection element 10, preferably firstly the first electrode 1 is provided, and the latter is subsequently provided with a basic material for the discharge dielectric 3 and then with a connection material for the connection dielectric 4. Afterward, the resultant composite or body is preferably provided with the second electrode and exposed to a temperature that is preferably below the melting point of copper, that is to say the preferred material of the first and second electrodes. The temperature can be, for example, between 500° C. and 1050° C. As a result of exposure to the temperature, the connection material is sintered together with the first and second electrodes 1, 2 and the connection dielectric 4 is formed. Furthermore, the discharge dielectric 3 is formed from the basic material during this exposure. The discharge dielectric 3 or the basic material is not completely sintered or densified in this case, with the result that the pores mentioned above remain in the discharge dielectric 3.

The production method and/or the overvoltage protection element 10 can relate to low-temperature firing ceramics.

Figure 1B:
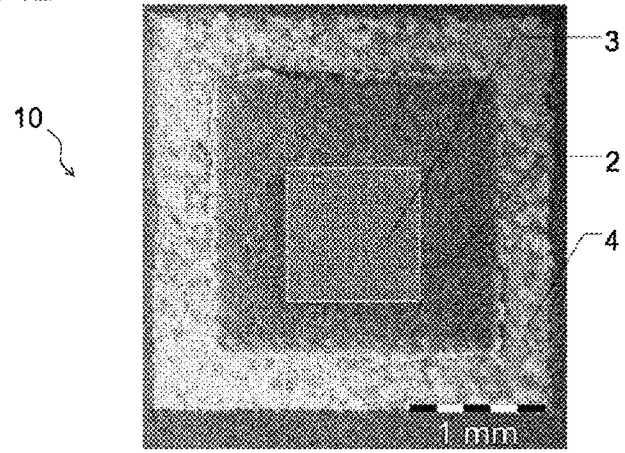
FIG. 1B shows a plan view of an overvoltage protection element.

FIG. 1B shows a microscopic plan view of an overvoltage protection element 10 in accordance with the embodiment shown in FIG. 1A. The overvoltage protection element 10 has a square basic area having an edge length of approximately 2.5 mm. The inner square with a white border indicates the area of the discharge dielectric 3. It can further be discerned that the second electrode 2 completely covers said discharge dielectric 3, such that the connection region 5 extends around the discharge region 6 and produces the mechanical stability of the overvoltage protection element 10 in the connection region 5.

Figure 1C:
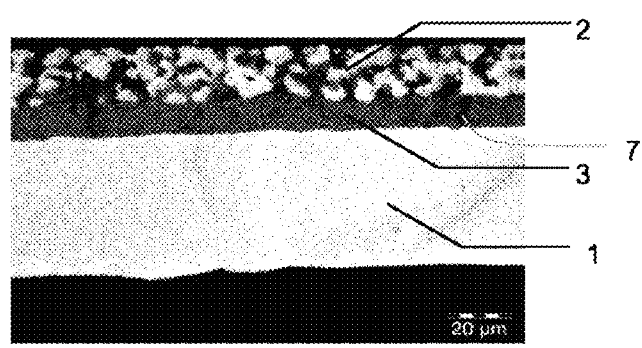
FIG. 1C shows an enlarged microscopic sectional view of a part of the overvoltage protection element from FIG. 1B.

FIG. 1C shows a microscopic sectional view of a part of the overvoltage protection element 10 in accordance with FIGS. 1A and 1B. It can discerned in FIG. 1C that the discharge dielectric 3 has a porous structure. Individual pores 7 having diameters of approximately 5 μm can be discerned in the discharge dielectric 3. The pores 7 can be filled during the operation of the overvoltage protection element 10, for example, with ambient air or with a gas mixture of $N_2$ and $H_2$, which is also used during the sintering of the overvoltage protection element 10 or of individual components thereof. Furthermore, the second electrode 2, which was applied by means of screen printing, for example, in accordance with this embodiment, has a porous structure, but this is not specifically of importance in the present application. In accordance with this embodiment, the first electrode 1 has been provided by means of a different production method (apart from screen printing), for example, a sheet drawing process with a thickness of approximately 50 μm.

Figure 2A:
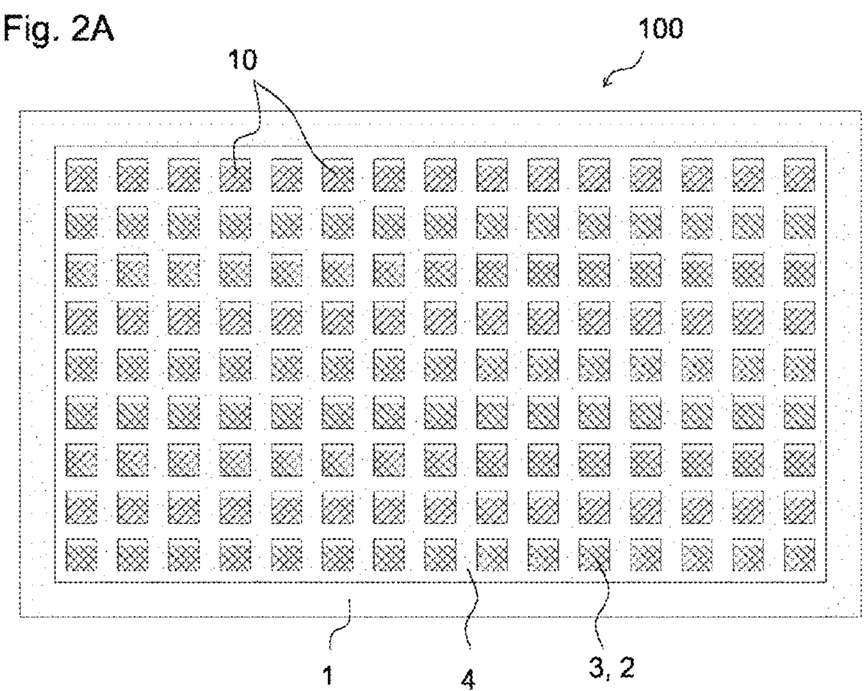
FIG. 2A shows a schematic plan view of an overvoltage protection component.

FIG. 2A shows an overvoltage protection component 100 comprising a multiplicity of overvoltage protection elements 10 arranged in an array. FIG. 2A illustrates the overvoltage protection elements 10 arranged in a 15-by-9 array on the same first electrode 1, for example, a copper sheet. FIG. 2A thus illustrates a common first electrode 1 and a multiplicity of second electrodes 2 in accordance with the number of overvoltage protection elements 10. Preferably, the individual overvoltage protection elements 10 are produced from the overvoltage protection component by singulation.

In this case, individual partial arrays or strips of the overvoltage protection component 100 or else the entire array shown in one piece can be processed further, for example, provided with an external termination or external electrode, and/or be integrated into the design of an assembly of an electronic component (not explicitly illustrated) that is to be protected against overvoltages.

Although not explicitly illustrated, individual overvoltage protection elements 10 or overvoltage protection elements 10 arranged alongside one another can also be arranged in a multilayer design one above another for forming an overvoltage protection component.

Figure 2B:
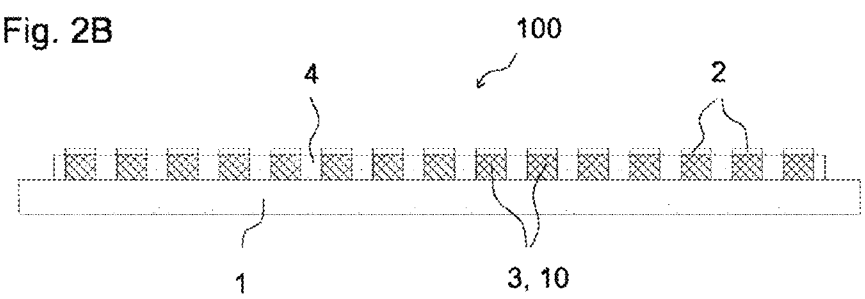
FIG. 2B shows a schematic side view of the overvoltage protection component from FIG. 2A.

FIG. 2B shows a schematic side view of the overvoltage protection component 100 in accordance with FIG. 2A. The checked areas in FIGS. 2A and 2B indicate in particular the porous structure or the porous material of the discharge dielectric 3.

The overvoltage protection component 100 preferably has a component thickness of between 3 μm and 100 μm.

Figure 2C:
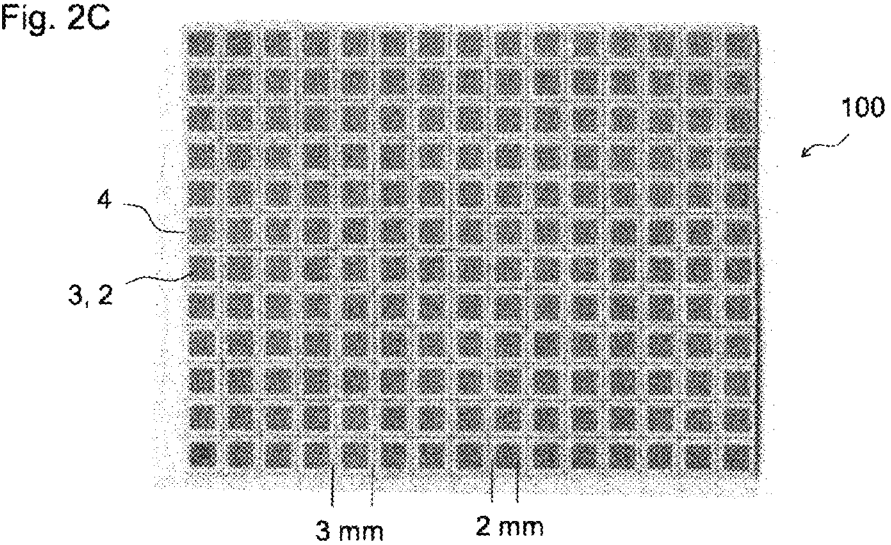
FIG. 2C shows a microscopic plan view of an overvoltage protection component.

FIG. 2C shows a microscopic plan view of at least part of an overvoltage protection component 100 constructed from an array of 12 by 15 overvoltage protection elements 10. The individual overvoltage protection elements 10 preferably have a width of approximately 3 mm and the second electrodes 2 preferably have a width of approximately 2 mm, as illustrated.

Figure 3A:
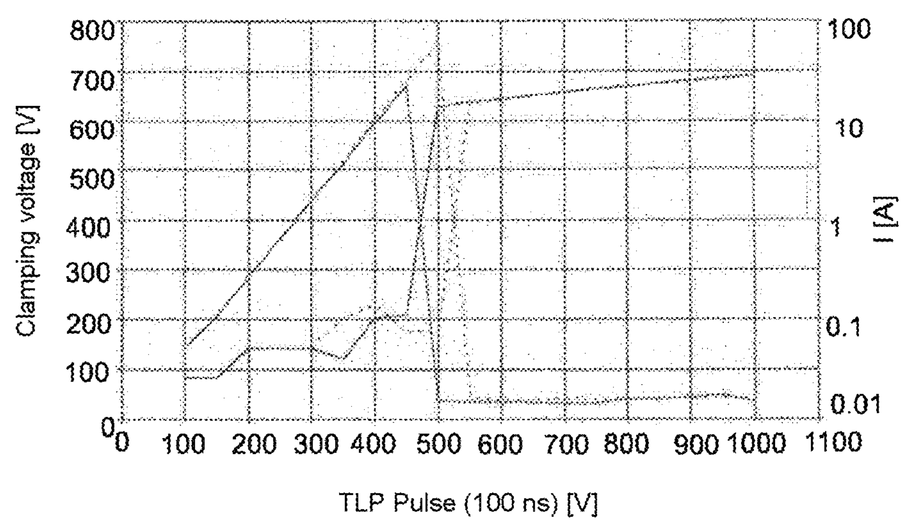
FIG. 3A shows an exemplary switching behavior of an overvoltage protection element in accordance with FIGS. 1A, 1B and/or 1C.

FIG. 3A shows by way of example the switching behavior of an overvoltage protection element 10 (see above). The discharge dielectric of the measured sample in this case has a square area of 0.8 by 0.8 mm and an electrode distance between the first electrode 1 and the second electrode 2 (cf. FIG. 1A, for example) of 40 μm. The thickness of the first electrode 1 here is approximately 50 μm.

It can furthermore be discerned that the switching or clamping voltage is illustrated on the left coordinate and the switching current is illustrated on the right coordinate for two different measurements. Both the clamping voltage and the TLP pulse are indicated in volts and the switching current is indicated in amperes. At a clamping voltage of approximately 700 V, the switching path formed by the discharge dielectric becomes conducting and the voltage falls to a value of approximately 30 V. At the same time, in each case the current between the first and second electrodes rises from below 0.1 A to approximately 30 A at a clamping voltage of 1 kV. This behavior applies to both measured samples/curves in a similar way.

Figure 3B:
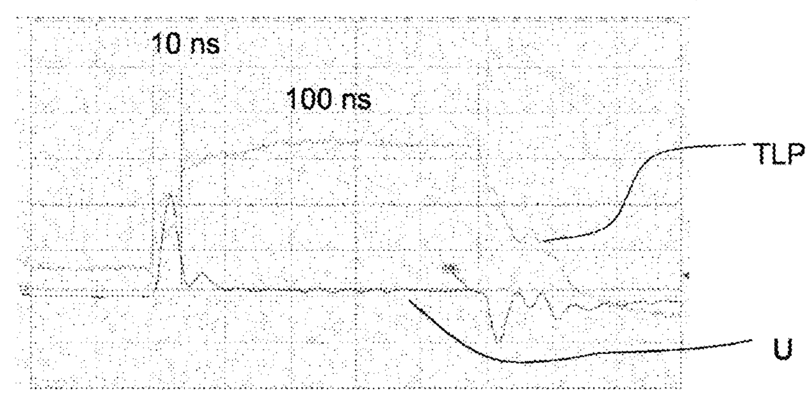
FIG. 3B shows an exemplary response behavior of an overvoltage protection element as a response to a rectangular test pulse in accordance with FIGS. 1A, 1B and/or 1C.

FIG. 3B illustrates the response behavior or a voltage profile of an overvoltage protection element as a response to a TLP pulse having a length of 100 ns. In the diagram from FIG. 3B, a clamping voltage, that is to say a voltage between the first electrode 1 and the second electrode 2, is plotted against a TLP pulse having a time duration of 100 ns. “TLP”, which stands for “transmission line pulse”, denotes a standard test method for integrated circuits which can be used to test the switching behavior, for example, as a response to an electrostatic discharge or overvoltage. The TLP pulse is designated by TLP and the voltage profile is designated by U in FIG. 3B. It can be discerned that the overvoltage protection element 100 becomes conducting as a result of the TLP pulse and a voltage rise occurs at the beginning of the pulse, which voltage rise has fallen to a remaining clamping voltage of approximately 30 V after approximately 10 ns. The voltage of the TLP pulse is approximately 1 kV.

Figure 4:
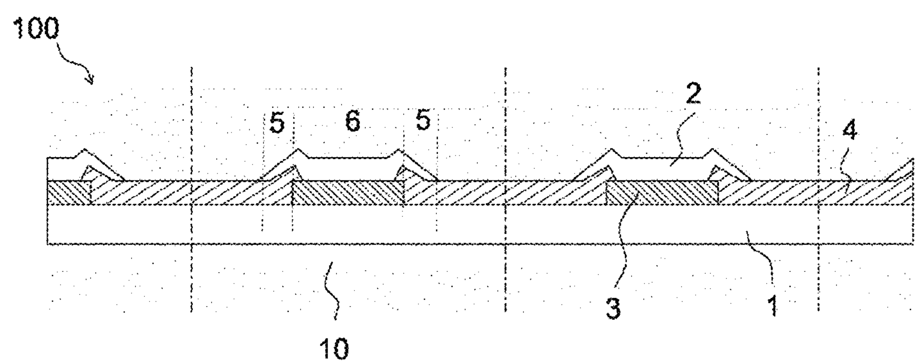
FIG. 4 shows a schematic side or sectional view of an overvoltage protection component, for example, in accordance with FIGS. 2A and/or 2B.

FIG. 4 shows a schematic sectional or side view of an overvoltage protection component 100 which, as indicated by the dashed vertical lines, can be singulated into individual overvoltage protection elements 10 (see above). The aforementioned singulation can be effected by sawing, cutting or stamping. The width or edge length of the discharge dielectric 3 or of the discharge region can be between 100 μm and 1000 μm here, wherein the distance between adjacent regions (cf. width/edge length of the connection regions) can be between 200 μm and 2000 μm.

The embodiment shown in FIG. 4 substantially corresponds to that from FIGS. 1A, 1B and 1C. In accordance with this configuration, the basic material for the discharge dielectric has preferably been applied by screen printing. FIG. 4 additionally shows that the connection dielectric in a region between the first electrode 1 and the second electrodes 2 at least partly overlaps the discharge dielectric 3. As a result, advantageously, the mechanical stability of the overvoltage protection component 100 or of the overvoltage protection elements 10 can be improved and/or else produced without the second electrodes 2.

Furthermore, it can be discerned that the connection dielectric 4 and the second electrodes 2 particularly in the connection region 5 have oblique sidewalls. Said sidewalls (not explicitly identified) can be caused by the process for producing the overvoltage protection component 100 and, in particular, increase the mechanical stability of the component. In accordance with the configuration mentioned (cf. FIGS. 1 and 4), the sintering temperature during the production process is preferably between 500° C. and 1050° C.

Furthermore, during the production process, for preventing an oxidation of the copper electrodes (cf. first electrode 1 and second electrodes 2), a protective gas atmosphere, for example, an atmosphere comprising an inert gas, hydrogen gas and/or a gas mixture of nitrogen and hydrogen ($N_2/H_2$), has been employed during sintering. In addition, the discharge dielectric 3 and the connection dielectric 4 in accordance with this embodiment are preferably formed by different or separate components or bodies, for example, dielectric bodies.

In accordance with the embodiment illustrated in FIG. 4, the discharge dielectric 3 and the connection dielectric 4 preferably directly adjoin one another, wherein there is an abrupt and/or discrete material phase transition between the components mentioned. Furthermore, the discharge dielectric 3 and the connection dielectric 4 are preferably arranged directly between the first electrode 1 and the second electrode 2.

Figure 5:
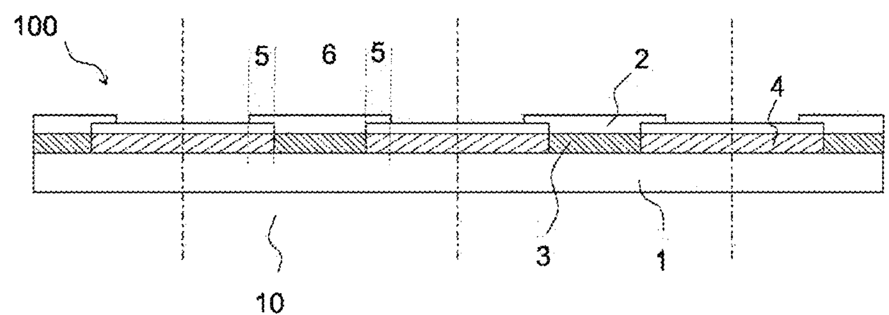
FIG. 5 shows a schematic sectional or side view of an overvoltage protection element in accordance with an alternative embodiment to FIG. 4.

FIG. 5 shows a schematic sectional or side view of an overvoltage protection component 100 in accordance with a further embodiment. In contrast to the embodiment illustrated in FIG. 4, each overvoltage protection element 10 comprises a common dielectric body (not explicitly identified) in which the connection dielectric 4 and the discharge dielectric 3 designate or form different material phases. In accordance with this configuration, the basic material for the discharge dielectric has preferably been applied by screen printing. In accordance with this embodiment, the connection dielectric 4 and the discharge dielectric 3 are furthermore cohesively connected to one another in the common dielectric body. During the production of the overvoltage protection component 100 in accordance with this embodiment, the first electrode 1 is preferably provided with the abovementioned basic material over a large area or over the whole area, wherein the temperature in this case is between 500° C. and 1050° C., preferably less than 800° C., and wherein the connection material (see above) diffuses through the basic material during exposure to the temperature, that is to say during the sintering, and the mechanical stability between the first electrode 1 and the second electrodes 2 is produced as a result.

In accordance with this embodiment, the connection material preferably comprises a glass or consists of a glass. Furthermore, the connection material and/or the connection dielectric which diffuses through the basic material preferably comprises no ceramic.

Figure 6:
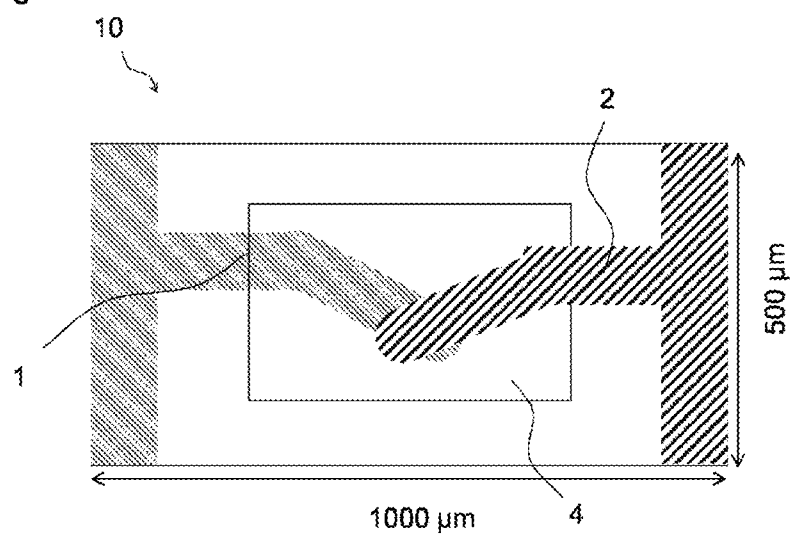
FIG. 6 shows a schematic plan view of an overvoltage protection element in accordance with a further alternative embodiment.

FIG. 6 shows a microscopic plan view of an overvoltage protection element 10 in accordance with a further embodiment. The overvoltage protection element, or the excerpt shown in FIG. 6, covers a rectangular area of approximately 1000 μm by 500 μm. In accordance with the embodiment shown, the overvoltage protection element 10 is embodied in a surface-mountable fashion. In other words, in accordance with this embodiment, parts of the first electrode 1 and also parts of the second electrode 2 are accessible from a top side of the overvoltage protection element 10. This surface-mountable configuration opens up, for example, the possibility of soldering the overvoltage protection element directly onto a printed circuit board or electronic assembly.

In accordance with this embodiment, the first electrode 1 has preferably already been provided and structured on a separate carrier (not explicitly illustrated). After the formation of the discharge dielectric 3 and the connection dielectric 4, a second electrode 2 has furthermore been applied and/or contacted in a structured fashion. Via the lateral outer edges on the left and right in FIG. 6, both electrodes are now accessible for surface mounting of the overvoltage protection element 10 and/or an electrical connection or contacting.

In accordance with this embodiment, preferably the electrodes or electrode structures are applied preferably by means of screen printing or some other suitable method. In a second step, for the basic material and/or the connection material preferably one or more ceramic pastes are applied as a layer. In this case, the first electrode 1 is preferably partly or completely covered by the layer, wherein said layer defines the distance between the electrodes. It is likewise possible here, for example, as described above, to stack a plurality of layer plies one above another and to sinter them afterward. The sample or the component is subsequently preferably provided with an external termination or external electrodes for an electrical contacting.

The invention is not restricted by the description on the basis of the exemplary embodiments. Rather, the invention encompasses any novel feature and also any combination of features, which in particular includes any combination of features in the patent claims, even if this feature or this combination itself is not explicitly specified in the patent claims or exemplary embodiments.

The invention claimed is:

1. An overvoltage protection element comprising:

a first electrode;

a second electrode;

a discharge region arranged between the first electrode and the second electrode, wherein a porous discharge dielectric comprising micropores is arranged in the discharge region; and a connecting region comprising a connection dielectric at least partly arranged in an overlapping interspace between the first and second electrodes, wherein the first and second electrodes are mechanically stably connected to one another via the connection dielectric, wherein the connection dielectric and the discharge dielectric are formed by different material phases in a common dielectric body, wherein the material phases of the connection dielectric and the discharge dielectric continuously merge into one another, and wherein the overvoltage protection element is configured to discharge a gas in the micropores of the discharge dielectric and to produce an electrically conductive connection between the first electrode and the second electrode.

2. The overvoltage protection element according to claim 1, wherein the discharge region has a thickness of between 5 μm and 50 μm.

3. The overvoltage protection element according to claim 1, wherein the discharge dielectric comprises zirconium oxide, aluminum oxide and/or magnesium oxide.

4. The overvoltage protection element according to claim 1, wherein the connection dielectric is connected to the first and second electrodes being mechanically more stable than the discharge dielectric.

5. The overvoltage protection element according to claim 1, wherein the discharge region and the connection region are arranged alongside one another.

6. The overvoltage protection element according to claim 1, wherein the connection region extends around the discharge region as viewed in a plan view of the overvoltage protection element.

7. The overvoltage protection element according to claim 1, wherein the discharge dielectric has a greater porosity than the connection dielectric.

8. The overvoltage protection element according to claim 1, wherein the discharge dielectric and the connection dielectric are formed by two different components of different materials.

9. The overvoltage protection element according to claim 1, wherein the first electrode is a copper layer having a layer thickness of between 10 μm and 100 μm.

10. The overvoltage protection element according to claim 1, wherein the overvoltage protection element is embodied in a surface-mountable fashion.

11. A method for producing an overvoltage protection element, the method comprising:

providing a first electrode with a basic material, the basic material being a material for a discharge dielectric, providing a connection material to the first electrode provided with the basic material, the connection material being a material for a connection dielectric;

forming a basic body by providing a second electrode to the first electrode provided with the basic material; and exposing the basic body to a temperature so that a connecting region comprising the connection dielectric is formed and at least partly is arranged in an overlapping interspace between the first and second electrodes, wherein the first and second electrodes are mechanically stably connected to one another via the connection dielectric, wherein the temperature is chosen such that the connection material is sintered with the first and second electrodes and the connection dielectric is formed, wherein the discharge dielectric is formed from the basic material, wherein the connection dielectric and the discharge dielectric are formed by different material phases in a common dielectric body, wherein the material phases of the connection dielectric and the discharge dielectric continuously merge into one another, wherein the discharge dielectric comprises micropores, and wherein the overvoltage protection element is configured to discharge a gas in the micropores of the discharge dielectric.

12. The method according to claim 11, wherein the temperature is below a melting point of copper.

13. The method according to claim 11, wherein providing the first electrode with the basic material comprises applying the basic material to the first electrode in a structured fashion.

14. The method according to claim 11, wherein the connection material is arranged alongside the basic material.

15. The method according to claim 11, wherein the first electrode is provided with the basic material over an area, wherein the connection material is applied to the basic material, wherein regions of the basic material remain free of the connection material, and wherein the temperature is between 500° C. and 1050° C.

16. The method according to claim 15, wherein the connection material diffuses through the basic material during exposure to the temperature so that a mechanical stability between the first electrode and the second electrode is produced.

17. An overvoltage protection element comprising:

a first electrode;

a second electrode;

a discharge region arranged between the first electrode and the second electrode, wherein a porous discharge dielectric comprising micropores is arranged in the discharge region; and a connection region, wherein a connection dielectric is arranged in the connection region, via which connection dielectric the first and second electrodes are mechanically stably connected to one another, wherein the connection dielectric is arranged at least partly in an interspace between the first and second electrodes, wherein the connection dielectric and the discharge dielectric are formed by different material phases in a common dielectric body, wherein the material phases of the connection dielectric and the discharge dielectric continuously merge into one another, and wherein the overvoltage protection element is configured to discharge a gas in the micropores of the discharge dielectric and to produce an electrically conductive connection between the first electrode and the second electrode.

* * * * *